Jan. 5, 1937.  J. W. BRYCE  2,066,762
SCALE
Filed July 12, 1933  7 Sheets-Sheet 1

INVENTOR
James W. Bryce
BY
W. M. Wilson
ATTORNEY

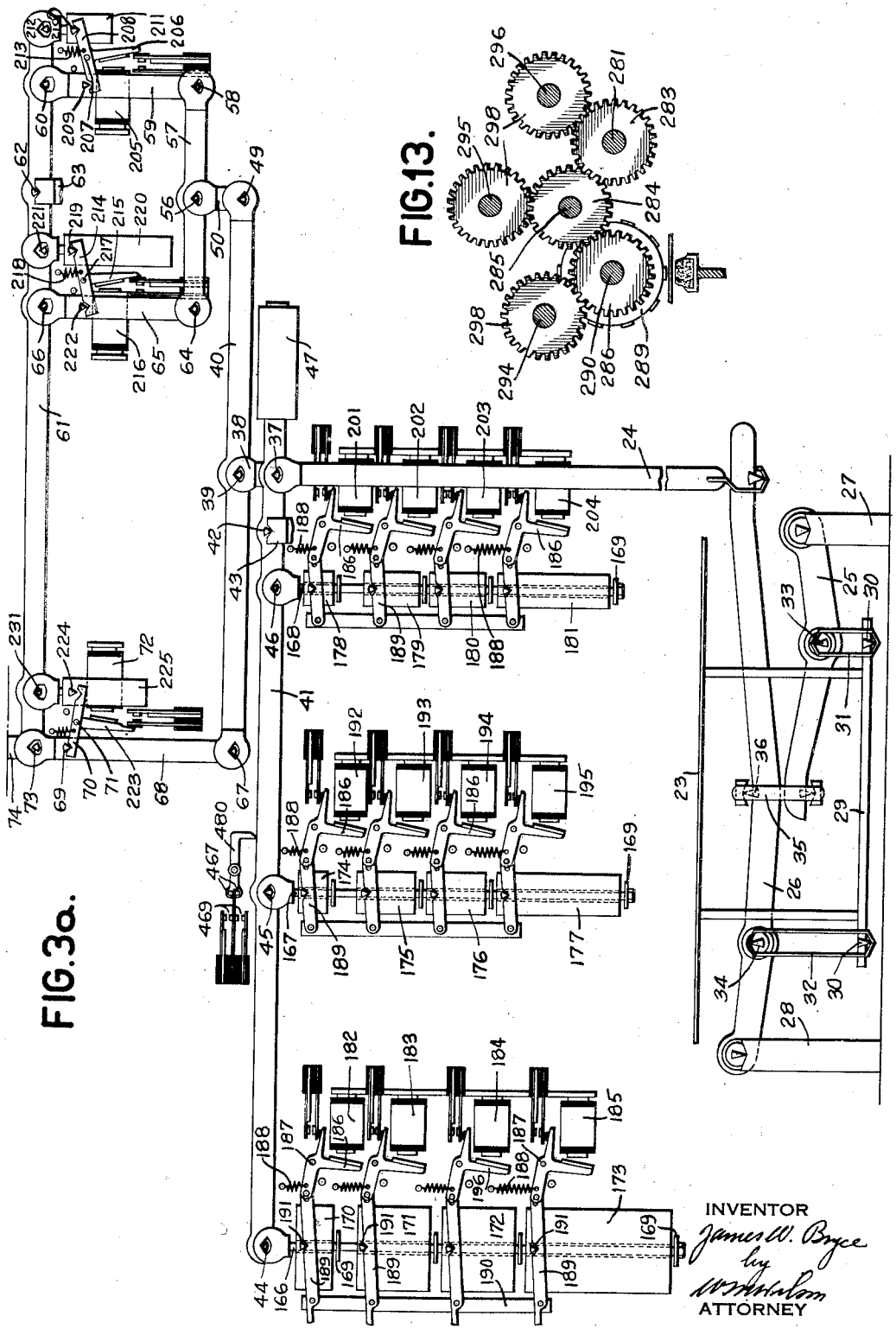

Jan. 5, 1937. J. W. BRYCE 2,066,762
SCALE
Filed July 12, 1933 7 Sheets-Sheet 3
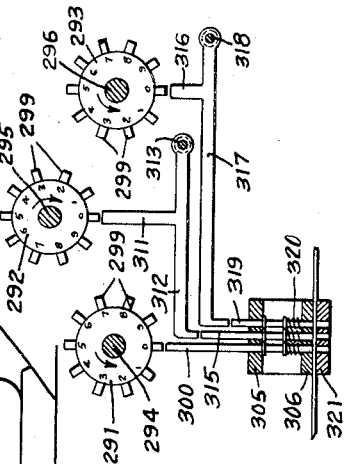
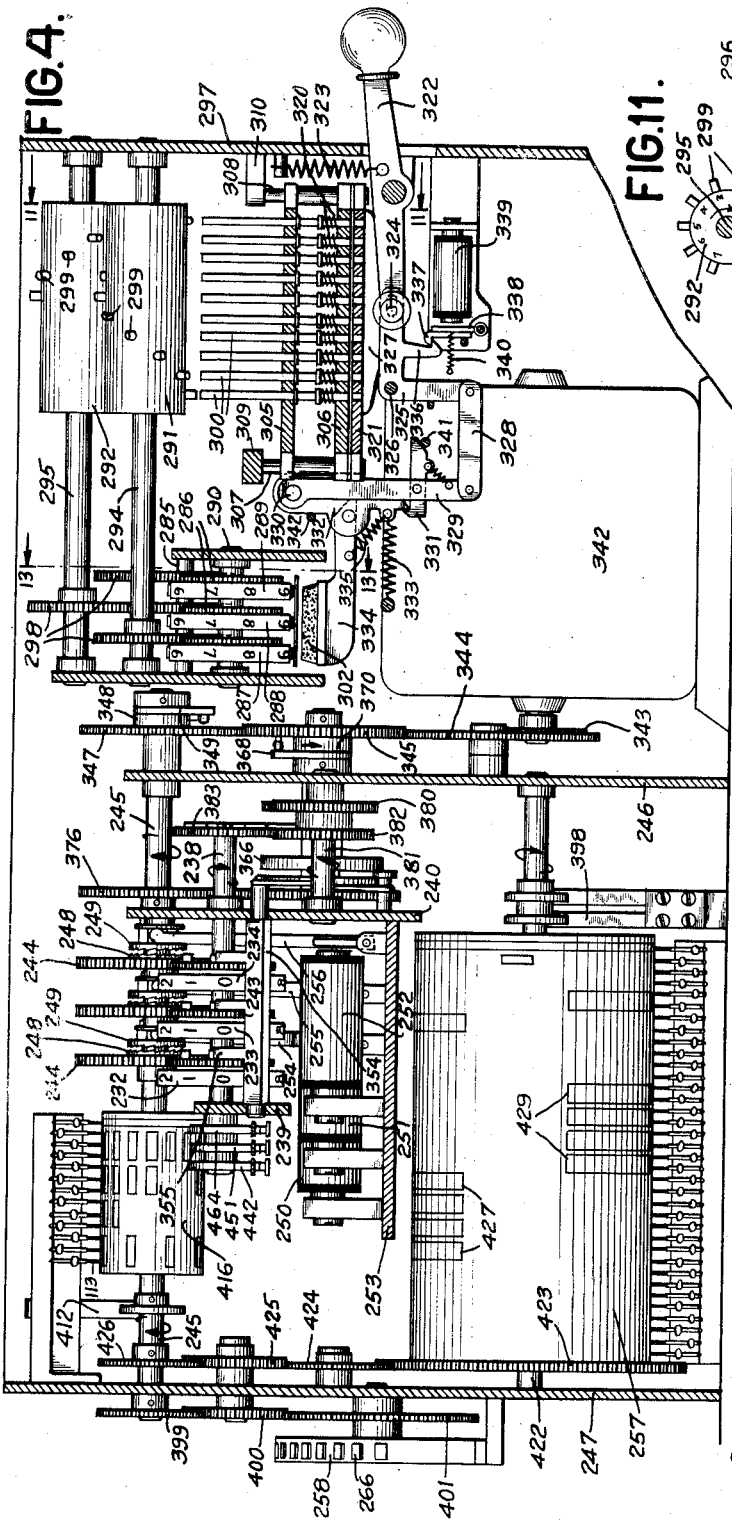
INVENTOR
James W. Bryce
BY
ATTORNEY Jan. 5, 1937.  J. W. BRYCE  2,066,762
SCALE
Filed July 12, 1933  7 Sheets-Sheet 4
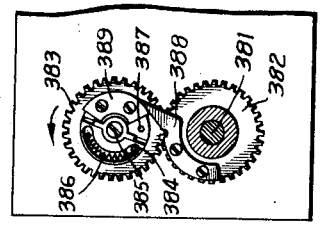
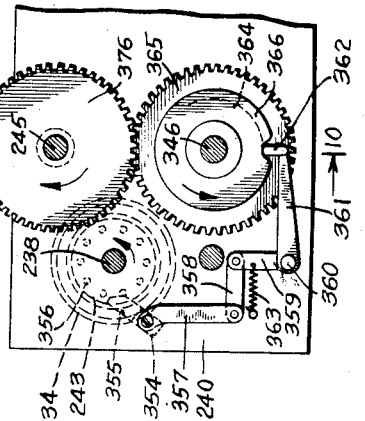
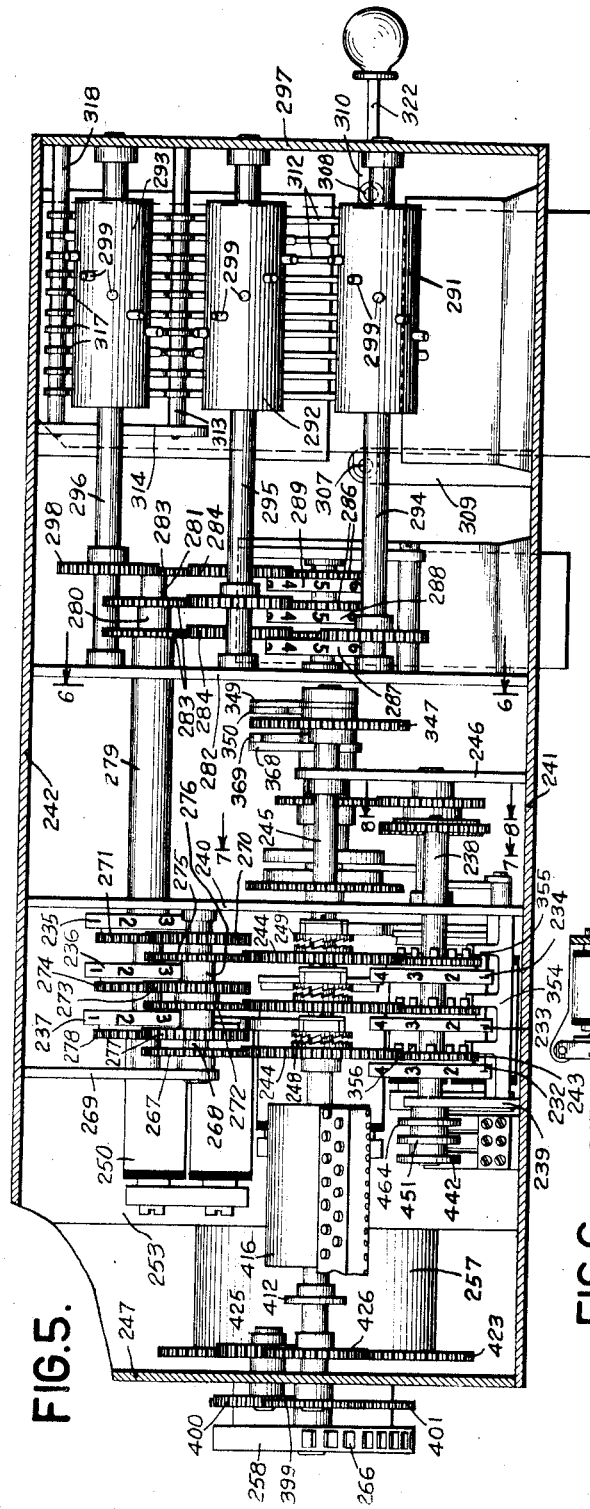
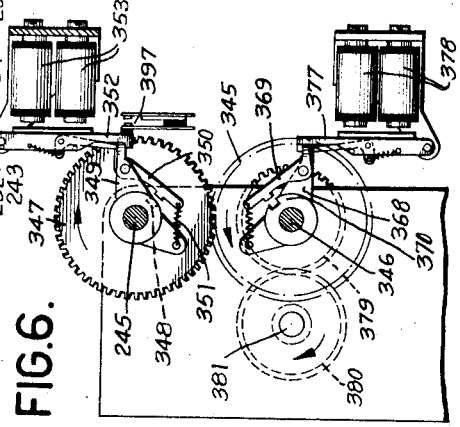
INVENTOR
James W. Bryce
BY
ATTORNEY Jan. 5, 1937. J. W. BRYCE 2,066,762
SCALE
Filed July 12, 1933 7 Sheets-Sheet 5

FIG.12.

Jan. 5, 1937. J. W. BRYCE 2,066,762
SCALE
Filed July 12, 1933 7 Sheets-Sheet 6

INVENTOR
James W. Bryce
BY
ATTORNEY

Jan. 5, 1937.  J. W. BRYCE  2,066,762

SCALE

Filed July 12, 1933  7 Sheets-Sheet 7

FIG.15.

INVENTOR
James W. Bryce
BY
ATTORNEY

Patented Jan. 5, 1937

2,066,762

UNITED STATES PATENT OFFICE 2,066,762

SCALE

James Wares Bryce, Bloomfield, N. J., assignor to International Business Machines Corporation, New York, N. Y., a corporation of New York Application July 12, 1933, Serial No. 680,025

39 Claims. (Cl. 265—70)

This invention relates to weighing scales and more particularly to scales of the factor lever type, including a mass sensing device.

One object of the present invention is to provide a scale of the offset weight type in which the offset weights are not applied until after the load is sensed or weighed.

Another object is to provide a mass sensing device in which the sensing of the digital values for different denominational orders is substantially concurrent.

Another object is to provide a weighing scale in which the setting up of sensed values is effected electrically so that there is no reactive effect on the weighing mechanism.

Still another object is to provide a weighing scale in which the application of offsetting weights is accomplished simultaneously with the sensing of the weight values.

A further object is to provide a weighing scale with means to change the ratio of a lever system for weighing to a plurality of denominational orders.

Another object is to provide a weighing scale with a novel signal to indicate the condition of the scale.

Another object is to provide a weighing scale with a novel indicating and recording mechanism which may be located remotely from the scale.

Still another object is to provide a weighing scale with novel sensing means and with a novel system of levers whereby a small portion of the load is distributed equally to each of the sensing means.

Another object is to provide a weighing scale with an indicating mechanism adapted to be reset under the control of the scale.

Various other objects and advantages of my invention will be obvious from the following particular description of one form of mechanism embodying the invention or from an inspection of the accompanying drawings, and the invention also constitutes certain new and novel features of the construction and combination of parts hereinafter set forth and claimed.

Figure 3:
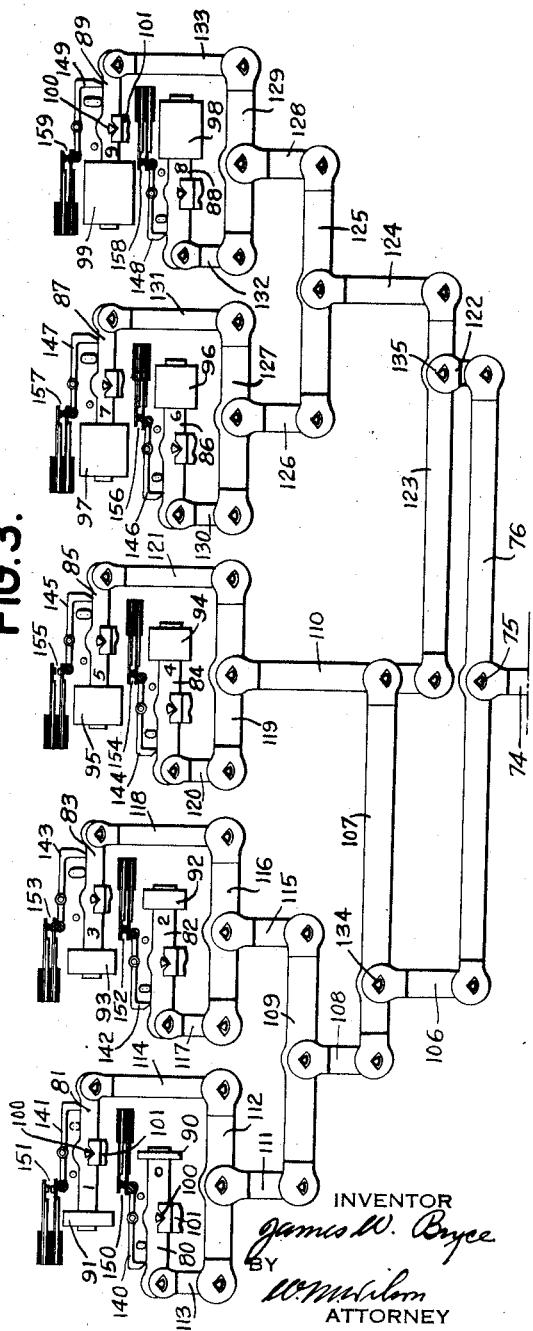

Figs. 3 and 3a taken together illustrate the factor levers, the sensing means, the off-setting weights and the ratio adjusting means.

Fig. 4 is a sectional view taken through the indicating and recording mechanisms.

Fig. 5 is a top plan view of the indicating and recording mechanisms with the machine casing broken away for clearness.

Fig. 6 is a detail view showing the indicator, printer and punch operating clutch and the resetting clutch.

Fig. 7 is a detail view of the indicator alining device.

Fig. 8 is a detail view of the indicator reset overthrow means.

Fig. 9 is a detail view of the scale balance indicator.

Fig. 10 is a fragmentary detail sectional view taken through the counter drive and reset drive gears.

Fig. 11 is a detail view of the punch selecting mechanism.

Fig. 12 is a schematic diagram of the electrical circuits of the machine.

Fig. 13 is a sectional view taken on line 13—13 (Fig. 4).

Figure 14:
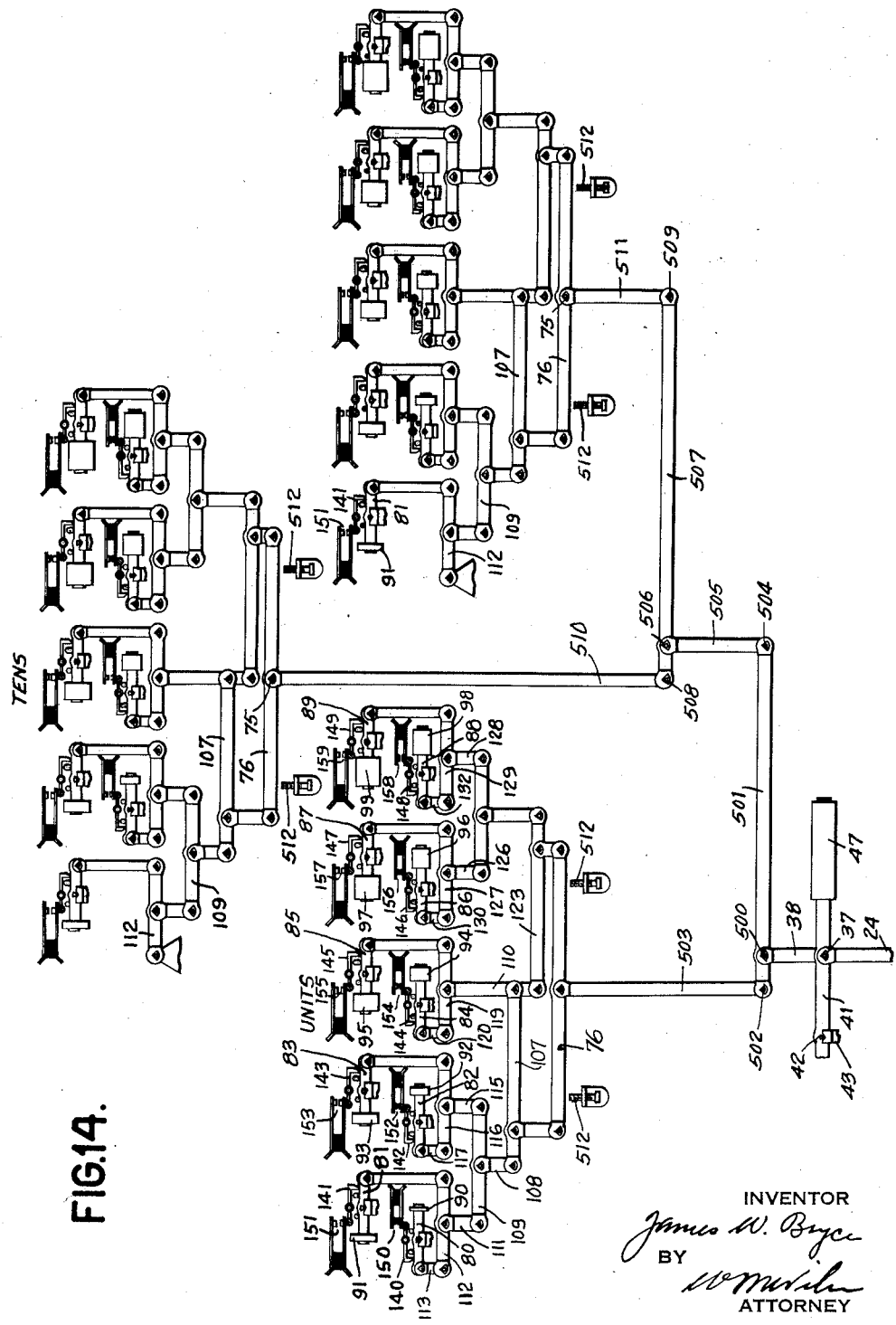

Figs. 14 and 15 illustrate a modified form of the invention utilizing three denominational order sets of sensing levers without the ratio levers and ratio changing devices.

General description

Described in general terms the scale forming the subject matter of the instant invention includes the usual load support connected through a system of levers to a balancing lever and to a system of ratio changing levers. These levers deliver a small portion of the load to a system of factor levers which in turn distribute equal portions of the load to a plurality of sensing levers there being a sensing lever for each digital order from 0 to 9 inclusive. The sensing levers are counter balanced by successively greater weights so that when a load is placed on the support the sensing levers will be unbalanced up to and including the highest digital order represented by the load.

Mechanism is provided to sense successively a plurality of denominational orders. For instance, if a weight of 564 units be placed on the support the scale will sense first the 500 hundreds, then the sixty tens and finally the 4 units, the sensing being accomplished in successive cycles of a weighing operation. Each weighing operation comprises a definite number of cycles. In the illustrative embodiment of the invention provision is made to weigh to three denomination orders but it is to be understood that it is not intended to limit the invention to weighing masses to any given number of denominational orders since by making certain obvious changes the number of denominational orders to which the scale will respond may be varied without departing from the spirit of the invention.

The first weighing cycle senses for hundreds of units which may be pounds, pounds and tenths of pounds, pounds and ounces, etc. The second cycle senses for tens of units of weight, and the third cycle senses for units, which successive sensing will be more fully brought out later.

The scale is automatic and, as soon as a load is placed on the load support the lowest or "0" digital sensing lever is unbalanced and initiates a cyclic operation of the weighing out mechanism. During the first cycle the load is applied to the sensing levers in equal portions through a lever system having a certain ratio between the load support and the sensing levers. The sensing devices automatically control mechanism to offset the hundreds of units of weight but leaving the scale unbalanced by the tens of units and units of weight of the load. Late in the first cycle the ratio of the lever system is changed and the operating mechanism proceeds into the second or tens cycle.

During the second cycle the same sensing operation is made but since the hundreds of units of weight was balanced off and the lever ratio changed the tens of units of weight is now read out. At this cycle the tens of units of weight are automatically offset in addition to the hundreds of units of weight offset at the first cycle, thus leaving the scale unbalanced by the weight represented by the units denominational order. Later in the second cycle the ratio of the lever system is again changed and at the third cycle the remaining unbalanced weight represented by the units denominational order is sensed and this weight automatically offset leaving the scale exactly in balance.

The machine stops when the scale is in balance and the operator may operate the printing and punching devices, after which the load is removed from the support, again throwing the scale out of balance. This initiates a reset operation during which the indicators, printing wheels and the punch selectors are restored to zero, the offset mechanism is operated to bring the scale into balance and the lever system is restored to its original condition. The scale is now in condition to proceed with another weighing operation.

Figure 2:
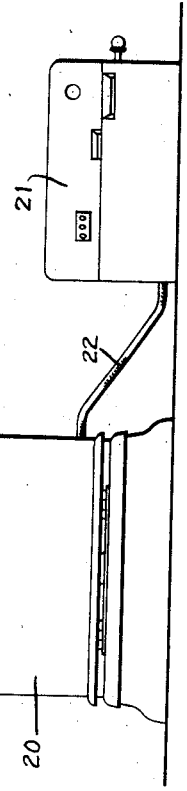
Fig. 2 represents the indicating and recording mechanisms removed from the scale but operatively connected thereto by a flexible cable of indeterminate length.
Figure 1:
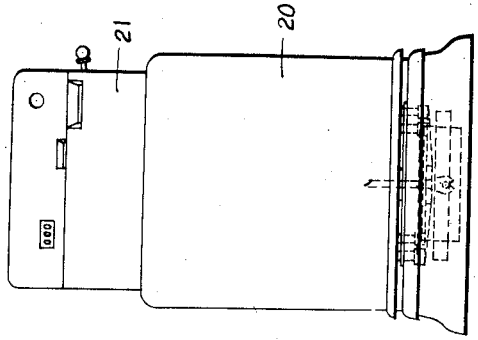
Fig. 1 is a view in front elevation of the scale having the indicating and recording mechanisms superimposed thereon.

In Figure 1 the scale is shown encased in the conventional casing 20 with the indicating and recording mechanisms mounted on top and enclosed in a casing 21. It is to be understood that the indicating and recording mechanism may be located remotely from the scale proper since it is connected thereto only by a cable connection 22 as illustrated in Figure 2.

*The scale—lever system*

Referring to Figures 3 and 3a, a weighing load is placed on a suitable load support 23. The action of the load is transmitted to a link 24 through the intermediary of any convenient transmitting system. The system chosen for illustrative purposes includes levers 25 and 26 pivotally supported on uprights 27 and 28 respectively. The platform 23 rests on a traverse 29 having pivots 30 projecting therefrom supported in loops 31 and 32 suspended respectively from pivots 33 and 34 on the levers 25 and 26. The free end of the lever 25 is supported by a loop 35 depending from a pivot 36 on the lever 26 and the free end of the lever 26 transmits the action of the load to the link 24.

At its upper end the link 24 is supported on a pivot 37 projecting from the lower end of a short link 38 which has its upper end supported on a pivot 39 projecting from the center of a horizontal lever 40. The pivot 37 in the link 38 also cooperates with a weight offset lever 41 fulcrumed at 42 on a fixed support 43. Various combinations of offset weights may be applied to points 44, 45, and 46 on the lever 41 as will be more fully explained later. A weight 47 is adjustably supported on the right hand (Fig. 3a) end of the lever 41 to balance the weight of the lever itself.

The right hand end of the lever 40 (Fig. 3a) is suspended on a pivot 49 carried by a link 50 having its upper end supported on a pivot 56 projecting from the middle of a lever 57. The right hand end of this lever is supported by a pivot 58 in the lower end of a link 59 depending from a pivot 60 in a lever 61 fulcrumed at 62 on a fixed support 63. The left hand end of lever 57 is supported on a pivot 64 in a link 65 depending from a pivot 66 in the lever 61.

The left hand end (Fig. 3a) of the lever 40 is pivotally supported at 67 to a link 68 having its upper end normally supported at 69 on one end of a pair of levers 70, one disposed on each side of the link 68. These levers 70 have a fixed pivot 71 and are adapted to be rocked in a manner to be described later by a magnet 72. The left hand end of the lever 61 is pivotally connected at 73 to a link 74 depending from a pivot 75 projecting from the mid-point of a horizontal lever 76.

The load applied to the support or platform 23 is applied through the lever system just described to the link 74, and is then split up and distributed in equal portions to a plurality of sensing levers 80, 81, 82, 83, 84, 85, 86, 87, 88, and 89 corresponding to the digits "0" to "9" inclusive. The sensing levers and weight distributing levers are counterbalanced by weights 90, 91, 92, 93, 94, 95, 96, 97, 98, and 99 respectively of increasing increments of weight. The weight 90 for the "0" lever 80 is just sufficient to counterbalance the lever 80 plus its share of the weight of the distributing levers and the weight 91 for the "1" lever equals the "0" weight plus one unit of weight. The "2" weight equals the "0" weight plus two units of weight, etc., to the "9" weight 99 which equals the "0" weight 90 plus nine units of weight.

The sensing levers 80 to 89 inclusive are mounted by pivots 100 on fixed supports 101. Each of the sensing levers receives its portion of the load from the link 74 through the following described system of levers.

The left hand end (Fig. 3) of the lever 76 is pivotally connected by a link 106 to a lever 107 which lever 107 has its left hand end pivotally connected by a link 108 to the mid-point of a lever 109. The right hand end of the lever 107 is pivotally supported on a vertically disposed link 110. The left hand end of the lever 109 is connected by a link 111 to the center of a lever 112 having its left hand end connected by a link 113 to the "0" sensing lever 80 and having its right hand end connected by a link 114 to the "1" sensing lever 81. The right hand end of the lever 109 is connected by a link 115 to the midpoint of a lever 116 having its left hand end connected by a link 117 to the "2" sensing lever 82 and its right hand end connected by a link 118 to the "3" sensing lever 83.

The link 110 is supported at its upper end at the mid-point of a lever 119 having its left hand end connected by a link 120 to the "4" sensing lever 84 and its right hand end connected by a link 121 to the "5" sensing lever 85.

The right hand end of the lever 76 is connected by a link 122 to a lever 123 having its left hand connected to the lower end of the link 110 and its right hand end connected by a link 124 to the mid-point of a lever 125. The left hand end of the lever 125 is connected by a link 126 to the centre point of a lever 127 and the right hand end of said lever 125 is connected by a link 128 to the centre point of a lever 129. The lever 127 is connected at its left and right hand ends by links 130 and 131 to the "6" and "7" sensing levers 86 and 87 respectively. The left and right hand ends of the lever 129 are connected by links 132 and 133 respectively to the "8" and "9" sensing levers 88 and 89.

The pivots 134 and 135 connecting the links 106 and 122 respectively to the levers 107 and 123 are located at points one-fifth the length of these levers from the outer ends thereof giving these levers a ratio of 1 to 4. Assuming that a load of 10 units of weight is applied to the lever 76 by the link 74, this weight will be distributed equally to all of the sensing levers, each sensing lever receiving a load of one unit of weight.

The ten-unit load applied to the lever 76 is split, one-half or five units being applied by the link 106 to the lever 107, and one-half or five units being applied by the link 122 to the lever 123. The levers 107 and 123 having a ratio of 1 to 4 deliver four units to the levers 109 and 125, and each of the levers 107 and 123 deliver a load of one unit of weight to the link 110 making the total load applied by said link 110 to the lever 119 two units.

The loads applied to the levers 109 and 125 are again split applying two units of weight to each of the levers 112, 116, 127, and 129. Each of these latter levers, including the lever 119, now has a load of two units of weight applied thereto. These loads are again split and a load of one unit of weight is applied by the links 113, 114, 117, 118, 120, 121, 130, 131, 132, and 133 respectively to the sensing levers 80 to 89 inclusive. Thus it can be seen that any weight applied to the lever 76 is distributed in equal portions to the ten sensing levers 80 to 89 inclusive.

As stated above, the weights 90 to 99 inclusive are of increasing increments of weight. Since the weight 90 on the "0" sensing lever 80 is just sufficient to keep it in balance it is obvious that any weight applied to the scale will unbalance this lever 80, but if one-tenth of the load applied to the lever 76 through the medium of the link 74 and the factor lever system is greater than the weight of the counterbalance 91 on the "1" sensing lever 81, this lever becomes unbalanced. Similarly if the loads applied to the levers 80 to 89 inclusive lies between the weights of the counterbalances 92 and 93 the "2" sensing lever 82 will be unbalanced but the levers 83 to 89 inclusive will remain in balanced condition. Obviously, therefore, all of the sensing levers whose counterbalances are of less weight than the load applied thereto will be unbalanced, and those sensing levers whose counterbalances are of greater weight than the load applied thereto will remain in balanced condition.

Associated with the sensing levers 80 to 89 inclusive are levers 140 to 149 respectively. These levers have one of their ends in contact with their corresponding sensing levers and their opposite ends adjacent a series of contacts 150 to 159 respectively associated with the several digital sensing levers. Closing the "0" contacts 150 effects cyclic operation of the scale and of the indicating mechanism as will be more fully described later. The contacts 151 to 159 inclusive read off the amount of the weight under the control of the sensing levers.

Offsetting weights

It was stated above that a weighing operation requires three cycles to weigh out to three denominational orders. During these cycles of operation certain things are automatically effected among which is the selective application of weights either singly or in combination to the offset weight lever 41 (Fig. 3a) under the control of the sensing devices and suitable commutators, to offset that portion of the load weighed out during that particular cycle. For instance, if a load of 462 units of weight be placed on the support 23, the lever 41 will be unbalanced to the full extent of the load. After the hundreds order, which in the example cited will be 400, is sensed and indicated, it is necessary to offset this 400 units of weight on the offset lever 41 by applying offset weights of the proper value and at the proper point on the lever 41. The several points 44, 45, and 46 of offset weight application on the lever 41 have definite ratios to the fulcrum 42 of the lever and the point 37 of load application, consequently the offset weights applied at these points may be accurately computed and need be of but a small fraction to the load itself.

Depending respectively from the points 44, 45, and 46 of the lever 41 (Fig. 3a) are rods 166, 167, and 168 each of which is provided with a plurality of offset weight supports 169, the lower one of said supports being retained by suitable nuts.

Associated with the weight rod 166 is a series of offset weights 170, 171, 172, and 173. These weights are adapted to be called either singly or in combination in a manner to be described later in connection with the description of the electrical circuits. Similarly weights 174, 175, 176, and 177 are associated with the rod 167, and weights 178, 179, 180, and 181 are associated with the rod 168.

The following chart lists the values in units of weight of the offsetting weights both singly and in combinations:

*Combinations*

| Value in units of weight | Hundreds | Tens | Units |
|---|---|---|---|
| 170—100 | 100—170 | 10—174 | 1—178 |
| 171—200 | 200—172 | 20—176 | 2—180 |
| 172—200 | 300—170+172 | 30—174+176 | 3—178+180 |
| 173—400 | 400—173 | 40—177 | 4—181 |
| 174—10 | 500—170+173 | 50—174+177 | 5—178+181 |
| 175—20 | 600—172+173 | 60—176+177 | 6—180+181 |
| 176—20 | 700—170+172+173 | 70—174+176+177 | 7—178+180+181 |
| 177—40 | 800—171+172+173 | 80—175+176+177 | 8—179+180+181 |
| 178—1 | 900—170+171+172+173 | 90—174+175+176+177 | 9—178+179+180+181 |
| 179—2 | | | |
| 180—2 | | | |
| 181—4 | | | |

In the example given above, namely that of weighing a load of 462 units of weight the load would be balanced off as follows: During the first cycle the 400 units of weight, which is sensed at this cycle, is balanced by applying weight 173 to the lever 41 at point 44. The scale is still unbalanced by the remaining load of 62 units of weight.

During the second cycle the 60 units of weight are sensed and mechanism to be described later is controlled to apply weights 176 and 177 to the point 45 on the lever 41 to balance off the 60 units of weight. At the third cycle the units of weight, 2 units in this example, is sensed and the weight 180 applied at the point 46 on the lever 41. Thus it may be seen that the load of 462 units of weight is balanced by the weights 173, 176, 177, and 180 totaling 462 units of weight and since at the end of a weighing operation this load is balanced by the weights applied to the lever 41, none of the load is applied to the lever system at the point 39. The scale is now said to be in balance.

The selection of the hundreds weights 170, 171, 172, 173 is effected by magnets 182, 183, 184, and 185 respectively. Energization of one of the magnets rocks its armature 186 counterclockwise about its pivot 187 against the tension of a spring 188. The armature 186 is operatively connected to a pair of levers 189 (only one being shown herein) embracing the weight associated therewith, said levers 189 being pivotally supported by a bar 190. The levers 189 are notched to receive pivots 191 one projecting from each side of each weight but only one appearing in the drawings.

The springs 188 are of sufficient tension to hold the armatures 186 at the limit of their clockwise movement which is limited by the pin and slot connection between the armatures and their levers 189, thus holding the weights free of the supports 169.

Upon energization of one of the magnets 182 to 185 inclusive it rocks the associated armature 186 counterclockwise and rocks the levers 189 clockwise thus lowering the particular weight 170 to 173 inclusive onto its support 169 on rod 166. The movement of the lever is sufficient to clear the pivots 191 permitting the entire weight to be applied to the rod 166.

The tens weights 174 to 177 are controlled respectively by magnets 192 to 195 inclusive and the units weights 178 to 181 are controlled respectively by magnets 201 to 204 inclusive. The armatures 186, springs 188 and levers 189 for the tens weights and for the units weights are similar to those parts associated with the hundreds weights and have therefore been given the same reference numerals.

*Ratio lever system*

In addition to selectively applying the offset weights the ratio of the lever system 40, 57, and 61 (Fig. 3a) is changed twice during the three cycles of a weighing operation. The ratio of this lever system between the points 39 and 73 during the first cycle, when weighing out the hundreds of weight units, is 1 to 200. Near the end of the first cycle this ratio is changed to 1 to 20 and near the end of the second cycle the ratio is again changed so that during the third cycle when the units of weight is weighed out this ratio is 1 to 2. The ratio of this lever system is restored to the 1 to 200 ratio during the reset cycle in readiness for the next succeeding weighing operation.

At the beginning of a weighing operation the ratio of the lever system 40, 57, 61 is therefore 1 to 200, that is, the application of 200 units of weight to the point 39 will result in the application of 1 unit of weight to the point 73. One-half of the load applied to the lever 40 is applied to the point 49 and also the fulcrum 56 of the lever 57, and one-half is applied to the point 67. During the first cycle, however, the point 67 forms a fixed pivot for the lever 40 since at this time the link 68 is supported by the lever 70. That part of the load applied to 49 and 56 is active to effect the weighing. The lever 57 evenly divides the load applied to its fulcrum 56, applying half of such load to each of the pivots 58 and 64, and by the links 59 and 65 to the pivots 60 and 66 on the lever 61. The fulcrum 56 of the lever 57 is offset to the left (Fig. 3a) of the fulcrum 62 of the lever 61 a distance equal to one one-hundredth of the distance from the fulcrum 62 to the point 73. This makes the effective ratio of the lever 61 from the points 62 to 56 and from 62 to 73 equal to 1 to 100 during the first cycle while weighing the hundreds of units of weight.

The ratio of the lever system is changed near the end of the first cycle by the energization of a magnet 205. The armature 206 of this magnet is pivoted at 207 and is secured to a pair of levers 208 (only one being shown) each of which levers have notches in the upper edges thereof to receive projections 209 on the link 59 and 210 on a counterbalance 211 adapted to be applied to the lever 61 at a point 212. A spring 213 normally holds the levers 208 and the armature 206 in retracted position, but upon energization of the magnet 205 (in a manner to be described later) the armature 206 and the levers 208 are rocked clockwise (Fig. 3a) raising the link 59 out of contact with the pivot 60 and applying the counterbalance 211 to the point 212 on the lever 61. The purpose of the counterbalance 211 is to compensate for the weight of the link 59 and its attached parts when this link is lifted free of pivot 60.

Raising the link 59 establishes a fixed pivot at 58 for the lever 57, consequently only one-half the load applied at 56 is now, at the second cycle, effectively applied to the lever 61 at 66. The ratio of the lever 61 between pivot points 66 and 73 is 1 to 5, and the resultant ratio between the points 39 and 73 is 1 to 20. As was stated above, weighing a mass of for instance 222 units of weight, the 200 weight units are balanced off during the first cycle by automatically applying the proper weight or weights to the point 44 of lever 41 thus leaving the 22 weight units effective during the second cycle. Assuming then that a load of 22 weight units is applied to the point 39, the point 56 will receive 11 units while but 5.5 units is applied to the points 64 and 66, and, since the ratio of the lever 61 is now 5 to 1 a load of 1.1 weight units is applied to the point 73.

During the second cycle when weighing the tens of weight units the 20 weight units are balanced by automatically applying the proper offset weight or weights to the point 45 on the lever 41, thus leaving a mass of 2 weight units applicable to the point 39 during the third cycle.

Near the end of the second cycle another change in ratio of the lever system occurs automatically. This time the ratio between the points 39 and 73 is 1 to 2, consequently the 2 units of weight applied to 39 is reduced to 1 unit of weight at the point 73. This change in ratio is effected in the following described manner: A pair of levers 214 (Fig. 3a) (only one being shown), secured together and secured to an armature 215 of a magnet 216 is pivoted at 217. A spring 218 normally holds the levers 214 in the position in which they appear in Figure 3a. Projections 219 on a counterbalance 220 rest in notches in the levers 214 supporting the counterbalance 220 clear of projections 221 on the lever 61.

The opposite ends of the levers 214 are normally clear of projections 222 on the link 65 but are adapted, upon energization of the magnet 216 to contact the projections 222 and raise the link 65 clear of the projection 66 on the lever 61. The counterbalance 220, whose purpose is to compensate for the weight of link 65 and its attached parts when this link is lifted free of pivot 66, is simultaneously applied to the lever 61 at the point 221.

Simultaneously with the energization of the magnet 216, the previously described magnet 72 is energized rocking its armature 223 together with the levers 70 counterclockwise rendering the link 68 effective to couple the lever 40 directly to the link 74. At their counterclockwise movement the levers 70 also contact projections 224 on a counterbalance 225 normally applied at a point 231 to the lever 61, raising this counterbalance free of the lever 61. The purpose of the counterbalance 225 is to compensate for the weight of link 68 and its attached parts when this link is lifted free of pivot 73.

The links 59 and 65 are now supported by the levers 208 and 214 respectively thus providing a fixed pivot at 49 for the lever 40 thus one-half of the load of 2 weight units applied at 39 is now applied at 67 and 73. At the third cycle the lever 61 fulcrumed at 62 is counterbalanced by the weights 211 and 220 and is ineffective to transmit any portion of the load applied to 39.

The magnets 205, 216, and 72 which control the changing of ratios, and the magnets which select the offset weights remain energized until a resetting operation occurs following a weighing operation. A description of a reset operation will be given later.

*Indicating and recording mechanism*

It is desired to indicate, as well as to print and punch the weights in three denominational orders. Two groups of three indicator wheels are provided, one group visible toward the front of the machine and the other group visible toward the rear of the machine. The three indicator wheels represent three denominational orders of weight units, that is, hundreds, tens and units, one denominational order wheel being set at each of the three cycles of a weighing operation.

It may be stated here that by changing the proportions of the offsetting weights the scale may be made to weigh in tens, units and tenths of weight units or, units, tenths and hundredths of weight units all of which weights may be indicated on the indicating mechanism now to be described.

Referring to Figure 5 the two groups of indicator wheels are designated as follows: Front indicators, hundreds order 232, tens 233, units 234. Rear indicators hundreds order 235, tens 236 and units 237. It may be seen that the order of the rear indicator wheels is reversed to that of the front so that the numbers displayed toward the rear will read in their proper denominational order. The indicators 232, 233 and 234 are rotatably mounted on a shaft 238 supported by a bracket 239 and a cross frame 240 extending between two frames 241 and 242 suitably mounted on a base (not shown).

Gears 243, one secured to the side of each of the indicator wheels, mesh with gears 244 rotatably mounted on an indicator drive shaft 245 supported in the frame 240, in a bracket 246 secured to the frame 241, and in a cross frame 247. Integral with each of the gears 244 is a clutch member 248 adapted to be engaged by a companion clutch member 249 mounted to rotate with but slidable longitudinally on the shaft 245. The members 249 are shifted into engagement with the clutch member 248 by the energization of magnets 250, 251 and 252 for the hundreds, tens and units orders, respectively. These magnets are mounted on a frame 253 upon which are also mounted the corresponding magnet armatures each of which is connected respectively to pivoted arms 254, 255, and 256, bifurcated at their upper ends to engage annular grooves in the corresponding denominational order clutch members 249.

The shaft 245 receives one complete rotation at each cycle of a weighing operation and the magnets 250, 251 and 252 are energized one at each cycle under the control of a commutator 257 and an impulse emitter 258 (see also Fig. 12). The emitter 258 rotates in synchronism with the rotation of the shaft 245, making one-half rotation per cycle, while the shaft 245 makes one complete rotation. As the rotor 259 of the emitter 258 rotates, one of a pair of brushes 260 wipes by a series of contacts 266 which are connected to the sensing contacts 151 to 159, inclusive. The other brush 260 contacts a segment 267 to complete a circuit through the highest value sensing contact closed due to the application of weight, through the emitter 258 and the commutator 257 which determines which one of the indicator magnets 250, 251 or 252 is to be energized.

Briefly the commutator 257 determines that the hundreds magnet 250 will be energized at the first cycle, the tens magnet 251 at the second cycle and the units magnet 252 at the third cycle, all of which will be more fully described later.

Energization of the magnets 250, 251, and 252 attracts their respective armatures rocking the levers 254, 255 and 256 counterclockwise (Fig. 4) shifting their corresponding clutch members 249 leftwards into mesh with the members 248. It is to be understood that only one of the clutches 248—249 is meshed at a given cycle and that these clutches are rendered effective in timed relation with the rotation of the shaft 245 and the passage of the brush 260 past the differential contacts 266. Thus a differential rotation is imparted to the indicator under the control of the highest value sensing contacts closed.

The rotation of the gears 244 is transmitted directly to the indicator wheels 232, 233, and 234 for the front indicator and this movement is also transmitted to the rear indicators by means of the following described mechanism.

The hundreds order gear 244 meshes with a gear 267 secured to a short shaft 268 mounted in the cross frame 240 and in a bracket 269 secured to the frame 242. A gear 270 secured to the shaft 268 near its opposite end meshes with a gear 271 fast to the hundreds order indicator wheel 235. The tens order gear 244 meshes with a gear 272 which has sleeved thereto a gear 273 which latter gear meshes with a gear 274 secured to the tens order indicator 236. The units order gear 244 meshes with a gear 275 connected by a sleeve 276 to a gear 277 which in turn meshes with a gear 278 secured to the units order indicator 237.

The setting of the indicator wheels is also transmitted to printing wheels and to punch selectors. The hundreds order wheel 235 is secured to the end of a sleeve 279, the tens wheel 236 is secured to a sleeve 280 and the units wheel 237 is secured to a shaft 281 which supports the sleeves 279 and 280 and the rear indicator wheels. The sleeves 279, 280 and the shaft 281 extend toward the right (Fig. 5) and are supported by the frame 240, bracket 269 and a cross frame 282. On the right hand ends (Fig. 5) of the sleeves 279 and 280 and the shaft 281 are secured gears 283 each of which meshes with an idler gear 284 on a short shaft 285. These gears mesh with gears 286, one secured to the side of each of three type carriers 287, 288, and 289 rotatably mounted on a shaft 290. The type carriers 287, 288, and 289 are respectively the hundreds, tens and units wheels, and through the trains just described are adjusted according to the setting of the indicators.

In addition to setting the indicators and the type carriers the differential setting of the gears 244 is transmitted to a plurality of punch selector drums 291, 292 and 293 (Figs. 4, 5, and 11) secured to shafts 294, 295, and 296 respectively, mounted in the frame 282 and a frame 297. Gears 298 secured one to each of the shafts 294, 295, and 296 are driven in the following manner: The gears 298 on the shaft 294 meshes with the gear 286 secured to the hundreds order type wheel 287. The gear 298 on the shaft 295 meshes with the tens idler gear 284 and the gear 298 on the shaft 296 meshes with the units order gear 283. Thus the differential setting of the indicators is transmitted to the corresponding denominational order punch selectors.

Arranged spirally around each of the drums 291, 292, and 293 is a series of radially projecting pins 299 (Figs. 4, 5, and 11). The pins 299 in the hundreds order drum 291 are adapted to cooperate with the extended upper ends of punches 300 carried in a frame comprising spaced punch plates 305 and 306 mounted to slide vertically on guide rods 307 and 308. The guide rod 307 depends from a bar 309 projecting inwardly from the frame 241 and the rod 308 is similarly supported by a bracket 310 projecting inwardly from the frame 297. The pins 299 in the tens order drum 292 cooperate with projections 311 extending upwardly from a series of selector fingers 312 pivotally supported on a rod 313. This rod is mounted in the frame 297 and in a bracket 314 on the frame 242. The free ends of the fingers 312 normally rest on the tops of punches 315 mounted in the frame 305—306. Similarly the pins 299 in the units drum 293 cooperate with projections 316 on fingers 317 pivoted on a rod 318 and having their free ends cooperate with punches 319 in the punch frame 305—306. Springs 320 normally hold the punches in elevated position.

A plate 321 mounted below the punch plate 306 and spaced therefrom forms, together with the plate 306, a channel adapted to receive a record card. After a card is inserted in this channel the punch frame 305—306 together with the plate 321 may be raised, the particular punch 300 having a pin 299 thereabove, and the punches 315 and 319 whose fingers 312 and 317 have pins 299 thereabove being held against movement to effect punching. All of the remaining punches are raised with the frame 305—306, the punches 315 and 319 rocking their fingers 312 and 317 slightly clockwise.

After the type carriers 287, 288, and 289, and the punch selector drums 291, 292, and 293 are set as above described, a printing platen 302 (Fig. 4) is operated to take an impression from the types and the punch frame is raised to effect the punching. In order to operate the printing and punching devices there is provided a manually operable lever 322 pivotally mounted in a bracket secured to the frame 297, and held in its retracted position by a spring 323. The inner end of the lever 322 carries a stud 324 which projects through a slot in one arm of a bell crank 325 pivoted on a stud 326, and which stud 324 projects under a rib 327 secured to the under side of the punch frame.

Obviously when the lever 322 is operated in a clockwise direction the stud 324 will raise the punch frame 305—306 and the plate 321 carrying the card upwardly to effect punching by the selected punches.

The other arm of the bell crank 325 is connected by a link 328 to the lower end of an arm 329 pivotally supported at 330. A spring pressed latch 331 pivotally carried by the arm 329 normally restrains an arm 332 also pivoted at 330 against the tension of a spring 333. The arm 332 pivotally supports an arm 334 which carries the platen 302. A spring 335 normally holds the arm 334 in retracted position.

The printing and punching lever 322 is normally locked against operation. This locking means includes a hooked projection 336 (Fig. 4) on the bell crank 325 with which projection engages a latch 337 carried by an armature 338 of a magnet 339. This magnet becomes energized late in the third cycle of a weighing operation, (in a manner to be described later) attracting its armature 338 and disengaging the latch 337 from the projection 336. The printing and punching lever 322 may now be operated. After the printing and punching operation is completed and the lever 322 is restored to its normal position by the spring 323, the latch 337 is reengaged with the projection 336 by a spring 340.

Operation of the lever 322 rocks the bell crank 325 counterclockwise and through the link 328 rocks the arm 329 in the same direction. At this movement the latch 331 draws the arm 332 therewith to lower the platen arm 334. The beveled right hand end of the latch 331 wipes by a stud 341 rocking the latch to release the arm 332 to the action of the spring 333 which rocks the arm 332 sharply clockwise to throw the platen sharply against the types taking an impression therefrom upon a suitable record material. The movement of the arm 332 is limited by a stop stud 342 so that when the lever 322 is restored by the spring 323 thus restoring the bell crank 325 and the arm 329, the latch 331 resumes its position to the left (Fig. 4) of the arm 332 in readiness of the next succeeding printing and punching operation.

The indicator drive shaft 245 (Fig. 4) is driven by a motor 342 through a train of gears as follows: gear 343 on the motor shaft, an intermediate gear 344 on the frame 246, a gear 345 loosely mounted on a reset shaft 346 (see also Figs. 6 and 10) and a gear 347 loosely mounted on the shaft 245. The gear 347 drives the shaft 245 through the medium of a clutch including a notched hub 348 on the gear 347 and an arm 349 secured to the shaft 245, said arm 349 carrying a coupling 350 which is normally held out of cooperative relation with the notched hub against the tension of a spring 351 by a shouldered armature 352 controlled by magnets 353.

As will be described later the magnets 353 are energized under the control of the "0" sensing lever 80 and its cooperating contact control lever 140, and, when energized, attract the armature 352 freeing the coupling 350 to its spring 351 and also freeing the arm 349 and shaft 245 for rotation. When the notch in the hub 348 arrives opposite the projection on the coupling 350 the spring 351 engages the coupling with the notch so that the shaft 245 is rotated therethrough.

Indicator aliners

Suitable aliners are provided to aline the indicators when they are at rest and means is provided to disengage the aliners when the indicators are being set and when they are being reset to zero. The aliners include a bar 354 (Figs. 4, 5, and 7) pivoted in the bracket 239 and in the frame 240, the bar 354 having a plurality of fingers 355 thereon cooperating with pins 356 projecting from the sides of the gears 243 opposite the sides to which the indicators are secured. Fast on the right hand end of the bar 354 (Figs. 4, 5, and 7) is an arm 357 connected by a link 358 to an arm 359 pivoted on a stud 360 in the frame 240 and hubbed to a cam arm 361 having a broad flange at its free end normally held by a spring 363 in contact with the low portion of a cam 364 integral with a gear 365 on the shaft 346, and in contact with a recess in the periphery of a cam 366 fast on the shaft 346. An arm 368, upon which is mounted a coupling 369 adapted to cooperate with a notched hub 370 on the gear 345, is likewise secured on the shaft 346 adjacent the gear 345 (see Fig. 6).

The gear 365 meshes with a gear 376 fast on the shaft 245 to operate the aliner cam 364 on weighing operations when the indicators are being set, and the coupling 369 is operated by an armature 377 under the control of reset clutch magnets 378 to couple the aliner cam 366 to the gear 345 on reset operations.

Obviously when the coupling 350 (Fig. 6) is rendered effective to couple the gear 347 to the shaft 245, this shaft will be rotated until such coupling is broken which occurs at the end of the third cycle of a weighing operation. The gear 376 drives the gear 365, the latter rotating in a counterclockwise direction. As soon as the gear 365 starts to rotate the cam 364 rocks the lever 361 and arm 359 clockwise which, through the link 358 rocks the arm 357 and the aliner bar 354 counterclockwise to move the fingers 355 out of the path of the pins 356 to permit free rotation of the indicator wheels 232, 233, and 234. Shortly after the wheels have rotated ten increments or steps the low portion of the cam 364 comes opposite the flange 362 of the arm 361 permitting the spring 363 to restore the aliner mechanism to its effective position. The cam 366 rocks the lever 361 to operate the aliner mechanism on reset operations.

Reset mechanism

After the completion of a weighing operation, and after the printing and punching operation has been manually effected the operator removes the load from the platform 23 and since the offset weights are still applied to the lever 41 (Fig. 3a) this lever becomes unbalanced which, as will be later described, initiates a reset operation by effecting the energization of the reset clutch magnets 378.

When these magnets are energized they rock the armature 377 (Fig. 6) releasing the coupling 369 to the influence of its spring. This couples the gear 345 to the shaft 346. Secured to this shaft is a gear 379 which meshes with a gear 380 mounted on a short shaft 381 and hubbed to a companion gear 382 (see Fig. 8). The gear 382 meshes with a gear 383 on the indicator shaft 238. The gear 345, driving through the train just described imparts one rotation in a counterclockwise direction as viewed in Fig. 8, to the gear 383 and the indicator shaft 238 to reset the front indicator wheels, the rear indicator wheels, the type wheels and the punch selector drums to zero or normal positions.

The gear 383 is countersunk to receive a disc 384 which is secured to the end of the indicator shaft 238 by a screw 385. The gear 383 and the disc 384 are yieldingly coupled together by a spring 386 but are normally rotated in unison through the medium of a pin 387 mounted in the disc 384 and projecting into a slot (not shown) in the gear 383. Near the end of the rotation of the gear 382 a tappet 388 secured to the side of the gear 382 strikes a block 389 secured to the disc 384 imparting a slight overthrow to the shaft 238 compressing the spring 386 which, as soon as the tappet 388 clears the block 389, restores the shaft 238 and the block 289 to the positions in which they appear in Figure 8. This action insures the restoration of the parts to their normal home position.

The rotation of shaft 238 resets the indicator wheels to zero in a manner well known in the art and which is fully disclosed in the patent to C. D. Lake, No. 1,600,414 issued September 21, 1926 to which reference may be had for a complete understanding of the resetting device.

As set forth above the cam 366 (Fig. 7) operates on resetting operations to actuate the aliner bar 354 to first remove the aliner fingers 355 from the path of the pins 356 and to then, at the end of the operation, reengage the fingers 355 with the pins to retain the indicators, type wheels and punch selector drums in zero position until the next weighing operation.

Operation—first cycle

A description will now be given of an actual weighing operation including a resetting operation and including a description of the circuit diagram illustrated in Figure 12.

In order to place the scale in operation a switch 391 (Fig. 12) is closed supplying current to main lines 392 and 393, and to the motor 342. The motor starts operating immediately driving the train of gears 343, 344, 345, and 347. Let it be assumed that a load of 864 weight units is placed on the platform 23 (Fig. 3a). The lever system below the platform may be of any convenient ratio, for instance, 20 to 1. One twentieth of the load, as 43.2 weight units will be applied to the link 24 (Fig. 3a) and to the point 39. One-half of the load applied to 39, that is 21.6 weight units is applied to the point 56, and as stated above, the ratio of the levers 57 and 61 is 100 to 1, therefore one one-hundredth of 21.6 weight units, or .216 weight units is applied to the link 74 and to the point 75 (Fig. 3). This load of .216 is distributed in equal loads to the ten sensing levers, each of said levers 80 to 89 inclusive receiving .0216 weight units. The adjustment of counter balances 90 to 99 is such that this load, being applied to each of the sensing levers, is sufficient to close all of the contacts 150 for the "0" lever 80, up to and including the contacts 158 for the "8" sensing lever, but is not enough to close the contacts 159 for the "9" sensing lever.

The closure of the "0" contact 150 establishes a circuit from the line 392 (Fig. 12) contacts 150, a relay coil 394 to the line 393. This energizes the coil 394 which closes contacts 395. The closure of contacts 395 is delayed by the use of a dash pot 396. When the contacts 395 are closed a circuit is established from the line 392, contacts 395 through the clutch magnets 353 to the line 393, energizing the magnets 353 to release the coupling 350 (Fig. 6).

The magnets 353 when energized also close contacts 397 setting up a holding circuit from line 392, cam contacts 398 (closed early in the first cycle), contacts 397, magnets 353 to line 393. This circuit maintains the magnets 353 energized throughout the three cycles comprising a weighing operation. Near the end of the third cycle the contacts 398 open deenergizing the magnets 353. The gear 347 now picks up the shaft 245, which, through a train of gears 399, 400, and 401 (Fig. 4) rotates the impulse emitter brushes 260 (Fig. 12) in synchronism with the rotation of the clutch members 249.

When the brush 260 comes into contact with the contact 266 connected to the highest value contacts 151 to 159 which are closed, the "8" contact 158 in this example, a circuit is set up from the line 392, the "8" contacts 158, wire 402, contact 266, brushes 260, contacts 405, 404, and 403. a brush 406, contact 407, under brush 406 during the hundreds weighing cycle, a brush 408, wire 409, through the coils of the hundreds indicator clutch magnet 250, wire 410 to line 393. As stated above energization of the magnet 250 couples the hundreds indicator gear 244 (Figs. 4 and 5) to the shaft 245 to thus set the indicator wheel according to the time of energization of the magnet 250.

Energization of the magnet 250 closes contacts 411 setting up a holding circuit from the line 392, cam contacts 412, contacts 411 now closed, magnet 250, wire 410 to line 393. At the same time the magnet 250 opens the contacts 403. The magnet 250 therefore is maintained energized from the "8" position to the "0" position thus holding the hundreds clutch 248—249 engaged so that the hundreds indicator wheel is rotated eight spaces. The contacts 412 open just after the "0" position breaking the holding circuit and deenergizing the magnet 250.

Simultaneously with the completion of the circuit through the hundreds indicator clutch magnet 250 a circuit also extends from the emitter 258 by a wire 413 and a brush 414 to a common contact strip 415 on an offset weight selecting commutator 416, mounted on the indicator drive shaft 245 (Figs. 4 and 5) and adapted to make one revolution therewith per weighing cycle of the machine. At the time the brush 260 of the impulse emitter 258 makes contact with the "8" contact 266, the "8" combination of segments 417 will be under a series of brushes 418 and concurrent circuits will be extended through three segments 417 comprising the "8" group to corresponding brushes 419 now in contact with a series of bridging segments 420 on the commutator 257 mounted on a shaft 422 and adapted to be driven through a train of gears 423, 424, 425, and 426, the latter gear being fast on the indicator drive shaft 245 (see Figs. 4 and 5). The ratio of this train of gears is such that the commutator 257 makes one third of one rotation for each weighing cycle bringing the segments 420 under the brushes 419 at the first or hundreds cycle, segments 427 are under the brushes 428 at the second or tens cycle and segments 429 are brought under brushes 430 at the third or units weighing cycle.

From the brushes 419 for the first segment 420 on the left (Fig. 12) the circuit extends through a wire 436 to the offset weight magnet 185 (see also Fig. 3a). From the next segment to the right the circuit extends to the second segment 420 from the left and thence by a wire 437 to the offset weight magnet 184. From the right hand segment 417 of the "8" group the circuit extends through the corresponding brushes 419 and segment 420, wire 438 to the magnet 183. Since there is no segment 417 in the right hand column no energy will be transmitted to the right hand segment 420 which is connected to the magnet 182 by a wire 439, consequently this magnet remains unenergized and its weight 170 (Fig. 3a) is not applied to the lever 41. The magnets 183, 184, and 185 being energized apply their weights 171, 172, and 173 respectively to the lever 41 to balance the hundreds of weight units representing that part of the load which is sensed at the first cycle.

Energization of the offset weight magnets closes contacts 440 energizing corresponding companion magnets 441 from line 392, cam contacts 442, magnets 441, contacts 440, wire 443 to line 393. The magnets 441 hold the armatures 186 for the selected weights 171, 172, and 173 in operated position after their associated magnets 185, 184, and 183 are deenergized due to the opening of the contacts 403. The contacts 442 are normally closed and open only on a reset cycle thus maintaining the selected magnets 441 energized and the offset weights controlled thereby applied to the lever 41 until a reset cycle occurs.

The offsetting weight for the hundreds amount has now been determined and applied to the lever 41. Near the end of the first weighing cycle the ratio of the lever system 40, 57, and 61 is changed from 1 to 200, to 1 to 20. This is effected automatically in the following described manner: The commutator 257 is provided with three segments 444, 445 and 446 which are energized from the line 392, brush 447 and common ring 448. Near the end of the first cycle the segment 444 passes under a brush 449 extending a circuit from the line 392, brush 447, ring 448, segment 444, brush 449, the previously described magnet 205 (see also Fig. 3a) wire 443 to the line 393. This energizes the magnet 205 which attracts its armature 206 and operates the lever 208 to raise the link 59 out of contact with the point 60 in the lever 61 and to apply the balance 211 to the point 212. As described above, this changes the ratio of the levers 40, 57, and 61 from 1 to 200 to 1 to 20.

Energization of the magnet 205 closes contacts 450 setting up a holding circuit from line 392 through cam contacts 451, contacts 450, magnet 205, wire 443 to line 393. The contacts 451 are normally closed and are opened only on reset cycles, consequently the magnet 205 remains energized until such reset cycle occurs.

*Operation—second cycle*

The machine now proceeds uninterruptedly into the second cycle at the beginning of which cycle the machine is in the following condition: Weights have been applied to offset the 800 weight units, and the ratio of the levers 40, 57, and 61 now is 1 to 20. The scale is in an unbalanced condition to the value of the remaining 64 weight units.

The commutator 257 has rotated from the point at which it is illustrated diagrammatically in Figure 12 to a point where the brushes 406 and 408 are between the segment 407 and a segment 431. The brushes 419 are between the segments 420 and 427 and the brushes 449 are between the segment 444 and the segments 445 and 446. The commutator 416 is in its home position, that is, with the brushes 418 just ahead of the "9" group of segments 417.

Early in the second cycle the brush 260 wipes by the contacts 266 for the "9", "8", and "7" orders but since the unbalanced weight is now but 64 weight units only the sensing contacts 150 to 156 inclusive are closed consequently the circuits are not completed until the brush 260 wipes the "6" contact 266. At this time a circuit is set up through contacts 156, wire 402 the "6" point of the emitter 258, contacts 405, 404, and 403, brushes 406 and 408 and the segment 431 now thereunder, wire 452, the tens indicator magnet 251, wire 410 to line 393. The magnet 251 closes its contacts 453 setting up a holding circuit from line 392, contacts 412, contacts 453, magnet 251, wire 410 to line 393. The magnet 251 opens the contacts 404 and also engages the tens indicator clutch 248—249 thus causing the tens indicator to be rotated six spaces to indicate "6".

Concurrently with the circuit through the magnet 251 a circuit is completed through the wire 413, brush 414, segments 417 in the "6" position on the commutator 416, brushes 418 for the first and second columns of segments 417, segments 427, brushes 428, wires 454 to the tens offset weight magnets 195 and 194, wire 443 to line 393.

Energization of the magnets 194 and 195 (see Fig. 3a) apply the weights 176 and 177 to the lever 41 to balance the 60 units of weight. The magnets 194 and 195 also close contacts 440 completing a holding circuit through their companion magnets through the contacts 442, which latter circuit holds the magnets 441 energized to maintain the proper selected weights applied until the contacts 442 are opened on the next succeeding reset cycle.

Near the end of the second cycle the segments 445 and 446 come under the brushes 449 simultaneously energizing magnets 216 and 72 which magnets close contacts 455 and 456 respectively completing holding circuits through contacts 451, contacts 455 and 456, magnets 216 and 72, wire 443 to line 393.

As previously set forth these magnets 216 and 72 (see also Fig. 3a) operate the links 65 and 68 to change the lever ratio from 1 to 20, to 1 to 2 preparatory to sensing out the units of weight at the third cycle.

Operation—third cycle

At the beginning of the third cycle the commutator 257 is in position with the brushes 406 and 408 between the segment 431 and a segment 457, the brushes 419 are between the segments 427 and 428. The segments 445 and 446 have passed the brushes 449 and the segment 444 will not come under the brushes 449 until late in the first cycle of the next succeeding weighing operation. The commutator 416 is in its normal position as shown in Figure 12. The indicators now stand at hundreds order "8", tens order "6" and units order at "0". The 800 weight units and the 60 weight units have been balanced by the application of the proper offset weights and the scale is unbalanced by the remaining 4 weight units.

The portion of this load applied to the sensing levers is just sufficient to close the sensing contacts up to and including the "4" contacts 154. As the brush 260 wipes the contacts 266 the previously described circuits are not made until the brush passes the "4" contact. When this occurs a circuit is completed through contacts 154, wire 402, emitter 258, contacts 405, 404, and 403, brushes 406—408 and the segment 457 now under these brushes, wire 458, the units indicator clutch magnet 252, wire 410 to line 393. Energization of magnet 252 in addition to operating the units clutch so that "4" may be run onto the units indicator wheel, closes contacts 459 completing a holding circuit from line 392, contacts 412, contacts 459, magnet 252, wire 410 to line 393. The magnet 252 also opens contacts 405.

When the brush 260 touches the "4" contact 266 a circuit is also completed through wire 413, brush 414, ring 415, the segment 417 in the "4" position on commutator 416, brush 418, the appropriate brushes 419 and the units segments 42, wire 454 to the magnet 204, wire 443 to the line 393. The magnet 204 closes the appropriate contacts 440 energizing the corresponding magnet 441. The magnet 204 applies the weight 181 (Fig. 3a) to the lever 41 at the point 46 to balance the "4" units of weight. The indicators and type carriers now stand at "864" and the punch selectors 291, 292, and 293, (Fig. 5) have been correspondingly set.

Late in the third cycle the cam contacts 398, open, and since at this time there is no effective weight applied to the sensing levers, the contacts 150 associated with the "0" lever 80 open deenergizing the clutch magnet 353 and bringing the indicator drive shaft 245 to a stop.

Also near the end of the third weighing cycle a segment 460 on the commutator 257 bridges a pair of brushes 461 completing a circuit from line 392, brushes 461 and segment 460, a magnet 462, to line 393. Energization of magnet 462 closes contacts 463 setting up a holding circuit from line 392, cam contacts 464, contacts 463, magnet 462 to the line 393. The magnet 462 also closes contacts 466 setting up a circuit from line 392 contacts 466, contacts 465, the magnets 339 which control the printing lever lock (see Fig. 4), to line 393. Energization of magnets 339 removes the latch 337 to permit operation of the printing and punching lever 322.

The scale is now in a condition of balance with the load on the platform and the indicators and type wheels set to display and print characters indicating the weight of the load on the platform.

The load may now be removed which unbalances the scale and automatically initiates a reset operation. Associated with the lever 41 (Fig. 3a) is a finger lever 480 mounted on a fixed pivot and carrying at its opposite end a pair of laterally projecting pins 467 embracing the center blade of a two-way switch. The outside members of this switch are connected together and to the line 392 and the center blade is connected through a magnet 468 to the line 393. This switch carries upper and lower contacts 469.

Upon removal of the load from the platform the scale becomes unbalanced under the influence of the applied offset weights rocking the lever 41 very slightly counterclockwise. The finger lever 480 following the lever 41 closes the upper contacts 469 thus completing a circuit from line 392, contacts 469, magnet 468 to line 393. Energization of magnet 468 closes contacts 470 completing a circuit from line 392, contacts 470, contacts 471 closed upon energization of magnet 462, reset clutch magnet 378 to line 393.

The magnet 378, when energized, releases the coupling 369 which effectively couples the reset shaft to the continuously rotating gear 345 to effect a reset operation.

The balance lever 41 also exercises control over a signal device 472 to indicate the condition of the scale, that is, whether the scale is in balance or out of balance. The magnet 468 when energized opens contacts 473 which contacts are normally closed and form part of a circuit from line 392, contacts 474, contacts 473, signal magnets 475 to line 393. So long as the scale is in balance the magnet 468 remains deenergized allowing the contacts 473 to remain closed to maintain the circuit through the signal magnets 475. These magnets being energized rock their armature 476 (Fig. 9) clockwise. The upper end of the armature 476 is bifurcated and embraces a pin 477 projecting from the pivoted arm supporting the signal 472. When the armature 476 is rocked clockwise, the signal 472 due to the coupling 477, rocks counterclockwise to display a suitable signal indicating that the scale is in balance.

When the contacts 469 (Fig. 12) close in either direction the magnet 468 becomes energized opening the contacts 473 to deenergize the magnet 475, whereupon a spring 478 rocks the armature 476 counterclockwise, rocking the signal 472 clockwise to the positions in which the parts appear in Figure 9 wherein a suitable warning signal is displayed indicating that the scale is out of balance. It may be stated here that the contacts 474 open at the beginning of the first cycle of a weighing operation and close near the end of the third cycle, thus controlling the signal to indicate that the scale is out of balance during weighing operations. The contacts 473 control the signal during reset cycles and while the machine is at rest to indicate the condition of the scale.

During the reset cycle the indicator wheels, type wheels and punch selectors are restored to their zero positions in a manner previously described. Also during the reset cycle the contacts 464 (Fig. 12) open to deenergize the magnet 462, contacts 451 open to deenergize the ratio control magnets 72, 216, and 205. Also the contacts 442 open to deenergize the offset weight magnets 441 which were energized during the preceding weighing operation.

It sometimes happens that after the offset weights have been applied for the hundreds, tens and units orders there still remains on the platform an unoffset weight, just under the minimum capacity of the scale to sense, but sufficient to maintain the "0" sensing contacts 150 closed.

In order to bring the machine to a stop at the end of the third weighing cycle under this condition the magnet 462 when energized late in the third weighing cycle, opens contacts 479 in circuit with the magnet 394 and the "0" sensing contacts 150, thus deenergizing the magnet 394 which allows contacts 395 to open. The clutch magnets 353 are then deenergized under the control of the cam contacts 398 in the above described manner.

The magnet 462 remains energized under the control of cam contacts 464 which remain closed during the interim between the weighing operation and the reset cycle. The contacts 464 open during the reset cycle deenergizing magnet 462, allowing contacts 479 to close.

The load having been removed from the platform in order to initiate a reset cycle the scale is now in complete balance and the "0" sensing contacts 150 are open.

At the end of the reset cycle the scale is in balance with no offset weights applied and no load on the platform. The recording and indicating mechanisms are standing at zero and the scale is in readiness for another weighing operation. It may be stated that, if after the weighing operation is completed and either before or after the printing operation, the operator, instead of removing the load from the platform, adds additional load thereto, the scale becomes unbalanced initiating closing the contacts 469 and automatically initiates a resetting operation. At the end of this resetting operation the scale is still in an unbalanced condition and the contacts 150 for the "0" sensing lever are closed which automatically initiates another weighing cycle continuously with the resetting cycle, during which the total load now on the platform is weighed out. The same operations are induced should a part of the load be removed from the platform after the weighing operation and before the resetting operation.

Also if the operator should increase or diminish the load on the platform during a weighing operation the scale will be unbalanced at the end of said operation and a resetting operation will be automatically effected continuously with the weighing operation and another weighing operation automatically initiated at the end of and continuously with the resetting cycle.

Modification

Figures 14 and 15 illustrate a modified form of the invention employing three sets of denominational order sensing lever systems instead of the above described ratio changing lever system and one set of sensing levers. These three sets of sensing levers are hereinafter referred to as the hundreds order, tens order and units order sensing levers. The units order sensing levers are exactly like the previously described sensing levers and those for the tens and hundreds orders are the same as the units order levers except that the "0" levers have been omitted and the left hand ends of the corresponding levers 112 (Fig. 14) are mounted on fixed pivots. The same parts in each of these lever systems are given the same reference characters and in the following description will be further distinguished by reference to the denominational order to which they belong.

In this modified embodiment of the invention the load applied to the links 24 and 38 (Fig. 14) is applied to a point 500 to a lever 501 having its left hand end pivotally connected at 502 to a link 503 depending from the lever 76 of the units order sensing lever system. The right hand end of the lever 501 is pivotally connected at 504 to a link 505 whose upper end is pivotally supported at 506 to a lever 507. The left and right hand ends of the lever 507 are respectively connected at 508 and 509 to links 510 and 511 having their upper ends pivotally supported by the levers 76 for the tens and hundreds order respectively.

Obviously a load applied to the point 500 is distributed unequally to the links 503 and 505, the link 503 receiving the greater portion of the load. The smaller portion of this load applied to the lever 505 and to the point 506 of the lever 507, where this portion of the load is unequally divided between the points 508 and 509, the greater portion being applied through the link 510 to the lever 76 for the tens order and the lesser portion is applied through the link 511 to the hundreds order lever 76.

This modified form of the invention is organized to make three cycles at each weighing operation similar to the cycles already described with the difference that instead of changing the ratios of certain levers the weight applied is sensed at the first cycle by the hundreds sensing levers 81 to 89, inclusive, at the second cycle by the tens sensing levers and at the third cycle by the units sensing levers.

Assuming that a load of 864 weight units is placed on the platform 23 and is applied through the lever system under this platform and through the levers 501 and 507 to all of the sensing levers. The greater part of the load applied to the lever 501 going to the units sensing levers closes all of the units contacts 150 to 159, inclusive, and the greater part of the load applied to the lever 507 going to the tens sensing levers closes all of the tens contacts 151 to 159, inclusive. The load applied through the link 511 to the hundreds sensing levers is just sufficient to close the hundreds contacts 151 to 158, inclusive, but not the "9" contact 159.

The hundreds order is sensed at the first cycle and reads out the 800 units of weight in a manner to be later described, and an offset weight is applied to balance off this portion of the load. The scale is still unbalanced by 64 units of weight which is applied in exactly the same manner to all of the sensing levers. This load is sufficient to close all of the units sensing contacts and the tens sensing contacts up to and including the "6" contact 156. That portion of the load applied through the link 511 is insufficient to close any of the hundreds contacts 151 to 159 inclusive.

The tens order is sensed at the second cycle and offset weights applied to offset the 60 units of weight leaving the scale still unbalanced by the 4 units of weight. This remaining load closes the units contacts 150 to 154, inclusive, but those portions of it applied to the tens and hundreds order sensing levers 81 to 89, inclusive are insufficient to close any of the contacts 151 to 159 for these orders.

The units order is sensed at the third cycle and offset weights automatically applied to balance off the 4 units of weight bringing the scale into balance and stopping the machine in the manner previously described.

Each of the levers 76 is provided with adjustable stops 512 to limit the downward movement thereof when a load is applied to the platform. The stops 512 are adjusted to permit just sufficient movement of their respective levers 76 to permit closing of all of the sensing contacts.

Referring now to Fig. 15 it may be noted that certain elements of the circuit diagram of the modified embodiment of the invention are exactly like the analogous elements in the circuit diagram shown in Figure 12. These identical elements include the controls at the left hand part of Figures 12 and 15, the weight selecting commutator 416 (Fig. 12), the commutator 257 with the exception of the ratio lever change control segments 444, 445, and 446 which are dispensed with in the modification (Fig. 15).

A description will now be given of an operation of the modified scale with reference to Figure 15.

The sensing contacts for the hundreds, tens and units orders are connected by a wire 513 to the line 392. The hundreds order sensing contacts are severally connected by wires 524 to corresponding segments 525 on an impulse emitter 531. The tens sensing contacts are similarly connected by wires 532 to corresponding segments 533 in the emitter 531 and the units sensing contacts are connected by wires 534 to segments 535 in the emitter 531. The rotor 536 of the emitter 531 carries two brushes 537 and 538 the former being adapted to wipe by the denominational segments 525, 533, and 535 at the three cycles comprising a weighing operation while the brush 538 contacts a common ring 539 connected serially through the contacts 405, 404, and 403 to the brushes 406, 408 and by the wire 413 to brush 414. The commutator 257 rotating one-third of one revolution per cycle brings the segments 407, 431, and 457 successively under the denominational brushes 406 and 408 to complete the circuits to the indicator clutch magnets 250, 251 and 252. The brush 414 energizes the conductor 415 and the segments 417, those brushes 418 which are in contact with segments 417 transmitting the current to brushes 419, 428, and 430 which are bridged at successive cycles by the segments 420, 427, and 429 for the purpose of energizing the selected offset weight magnets.

When a load is applied to the platform, for example, a load of 864 weight units, all of the units and tens sensing contacts and the hundreds contacts up to and including the "8" contact close. Closure of the "0" contact in the units order, as previously set forth, energizes magnet 394 which closes contacts 395 under the control of the dash pot 396 to energize the clutch magnets 353. As soon as the clutch controlled by these magnets becomes effective the shaft 245 (Figs. 4 and 5) starts rotating driving the commutator 257, the commutator 416 and the rotor 536 for the emitter 531. The segment 407 comes into contact with the brushes 406, 408 early in the cycle directing the current to the hundreds order sensing contacts so that when the brush 537 wipes the "8" contact 525 on the emitter 531, a circuit is established from the line 392, wire 513, "8" contacts 158 for the hundreds order, wire 524, "8" contact 525, brush 537, brush 538, ring 539, contacts 405, 404, and 403, brush 406, hundreds segment 407, brush 408, wire 409, hundreds indicator clutch magnet 250, wire 410 to line 393.

Another circuit extends concurrently over wire 413, brush 414, conductor 415, to the "8" combination of segments 417 now in contact with brushes 418 to the brushes 419 which are bridged by the hundreds segments 420 at this cycle, wires 436, 437 and 438 to the hundreds offset weight magnets 183, 184, and 185 energizing those magnets to apply the weights 171, 172, and 173 (Fig. 3a) in order to balance off the 800 units of weight. Energization of the magnets 183, 184, and 185 closes corresponding contacts 440 to energize holding magnets 441. This is necessary because as soon as the magnet 250 is energized it opens contacts 403 to interrupt these circuits and closes contacts 411 to set up a holding circuit through the cam contacts 412.

The hundreds indicator clutch magnet causes the engagement of the hundreds clutch whereby "8" is run onto the hundreds indicator wheel.

At the second cycle the brush 537 wipes the tens contacts 533 on the emitter 531. Since the hundreds order weight units were balanced off at the first cycle the scale is unbalanced by the remaining 64 units of weight at the beginning of the second cycle. This closes all of the units sensing contacts and the tens contacts up to and including the "6" contact so that, when the brush 537 wipes the "6" contact 156, a circuit is set up from line 392, wire 513, tens order sensing contact 156, "6" contact 533, brushes 337 and 338, ring 339, contacts 405, 404, and 403, tens brushes 406 and 408 and the tens segment 431, wire 452, tens clutch magnet 251, wire 410 to line 393. Concurrently a circuit is completed through the "6" combination of segments 417 on the commutator 416, and through the tens segments 427 to the proper ones of the offset weight magnets 192, 193, 194, and 195, which in this case includes the weights 194 and 195 to balance the 60 weight units.

At the beginning of the third cycle the scale is unbalanced by the "4" weight units. This load is not sufficient to close any of the tens or hundreds sensing contacts and is just sufficient to close the units sensing contacts up to and including the "4" contacts 154, consequently the circuits are completed when the brush 537 wipes by the "4" contact 535 of the units group on the emitter 531. This energizes the units indicator clutch magnet 252 and selects the "4" group or combination of segments 417 which in this particular instance comprises a single segment 417. The weight selecting circuit is directed to the units weight magnet 204 (Figs. 15 and 3a) applying the weight 181 to balance off the 4 weight units.

Near the end of the third cycle the segment 460 bridges the brushes 461 energizing magnet 462 which opens contacts 470 deenergizing magnet 394 which in turn opens contacts 395 to deenergize the clutch magnets 353 thus bringing the machine to a stop at the end of the cycle.

A reset cycle is initiated and the machine is controlled during a reset cycle exactly as set forth above, also the printing and punching mechanisms are controlled and operated as described above.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a weighing scale, the combination with a load support, of a series of load sensing devices having different combinations of positions, each such combination representing a different load value, a pivoted beam operatively connected to the load support, a plurality of load offsetting devices, and means controlled by the sensing devices according to their combinational position to selectively apply the offsetting devices to the beam to offset load on the support.

2. In a weighing scale, the combination with a load support, of a series of load sensing devices, means intermediate the support and the sensing devices to distribute the load to the sensing devices, a pivoted beam, a plurality of load offsetting devices, and means controlled by the sensing devices to selectively apply the load offsetting devices to the beam.

3. In a weighing scale, the combination with a load support, of a series of load sensing devices, means interconnecting the support and the sensing devices to distribute the load to said sensing devices, a plurality of indicators, and means controlled by the sensing devices to set the indicators.

4. In a weighing scale, the combination with a load support, of a series of load sensing devices, plural load offsetting means, actuating means for the load offsetting means, said actuating means being independent of the gravity of the load, and means controlled by the sensing means to select the offsetting means for actuation.

5. In a weighing scale, the combination with a load support, and a main operating mechanism, of a plurality of load sensing devices, a plurality of denominational order indicators, a drive shaft for said indicators, means controlled by the sensing devices upon application of a load to the load support to couple the shaft to the operating mechanism, means controlled by the sensing devices to determine the extent of operation of the indicators, a reset shaft for the indicators, and means to couple said reset shaft to the operating mechanism to reset the indicators to zero.

6. In a weighing scale, the combination with a load support, and cyclically operating mechanism with means to drive it through a plurality of cycles at each weighing operation, of a series of load sensing devices, a plurality of indicators, a drive shaft actuated by the operating mechanism through one rotation at each cycle, and means controlled by the sensing devices to couple the indicators to the shaft in successive cycles, a different indicator each cycle, for differential operation during the cycle by the shaft.

7. In a weighing scale, the combination with a load support, of a series of load sensing devices, a plurality of denominational order recording elements, means coacting with the sensing devices to determine the value of the load sensed by the sensing devices, and means controlled by the first-mentioned means to successively set the denominational order recording elements according to the value of the load.

8. In a weighing scale, the combination with a load support, of a plurality of sets of load sensing devices each of said sets having a denominational significance, a plurality of denominational sets of load offsetting devices, means connected to the load support and to which the load offsetting devices are applied to counterbalance the load, and instrumentalities controlled by the sensing devices to selectively apply to said means the offsetting devices from the corresponding denominational set of such devices.

9. In combination; load weighing mechanism, a series of sensing elements simultaneously and selectively reactive to operation of the weighing mechanism upon application of a load to the latter to sense digital values of a denominational order of the applied load, and automatic load manifesting means controlled by the sensing elements after they have completed the sensing of said order of the load for operation according to the digital value of the load sensed by the elements.

10. In combination; load weighing mechanism, sensing elements in ordinal relationship selectively responsive to operation of the weighing mechanism for sensing a denominational order of load values acting on said mechanism, each such element being selectively responsive to a different digital value of the load order, control devices corresponding to said elements, one device to each element to sense the response of the element to the load, and value manifesting means selectively controlled by said devices to manifest the load value to which said elements respond.

11. In combination; load weighing mechanism, levers selectively cooperating with the weighing mechanism to sense a denominational order of load values acting on said mechanism, each such lever selectively sensing only a single, different digital value of the load order, and selectively operable automatic load manifesting mechanism controlled for operation by said levers in accordance with the load value sensed thereby.

12. In combination; load weighing mechanism including load counterbalance mechanism, an ordinal series of movable sensing elements cooperating with the weighing mechanism to sense an order of load values, each such element having selective cooperation with the weighing mechanism to sense a different digital value of the load order, and means controlled by said elements in accordance with the load value sensed thereby for selectively operating said load counterbalance mechanism to counterbalance the load acting on said weighing mechanism.

13. In combination; load weighing mechanism including factor levers to factor the load into separate load force portions, load value sensing elements connected to the factor levers each to receive and respond to a separate load force portion to sense load values, selectively operable load manifesting mechanism, and electrical controlling means cooperatively connecting said elements and said selectively operable mechanism to control operation of the latter according to the load values sensed by said elements.

14. In combination; load weighing mechanism, an order of electrical sensing elements responsive to operation of the weighing mechanism under a corresponding order of load values, each such element corresponding to and sensing a different digital value of the load order, value manifesting means, and electrical circuits selectively controlled by said elements for governing operation of the value manifesting means to manifest the load value sensed by said elements.

15. In combination; load weighing mechanism including factor levers to factor the load into separate load force portions, load value sensing elements connected to said factor levers to each receive and respond to a single one of said load force portions, circuits selectively controlled by said elements in accordance with the load value sensed by the latter, and selectively operable load manifesting mechanism selectively controlled for operation by the circuits in accordance with the operation of the sensing elements.

16. In combination; load weighing mechanism, a series of circuits corresponding to different load values, means automatically responsive to operation of the weighing mechanism upon application of a load thereto for selecting one of said circuits for effective operation, load manifesting mechanism to be controlled by said selected circuit when the latter is rendered effective, and an automatic actuator including a cyclically operable contactor having an invariable cycle of operation for rendering the selected circuit effective during said cycle to control the last-named mechanism according to the load value corresponding to said circuit.

17. In combination; weighing mechanism, a series of circuits corresponding to different load values, means automatically responsive to application of a load to the weighing mechanism for partially closing one of the circuits, an automatic actuator including a cyclically operable contactor having an invariable cycle of operation, commutator contacts one in each said circuit successively engaged by said contactor during its cycle to complete the partially closed circuit, and load manifesting mechanism selectively controlled by the completed circuit.

18. In combination; load weighing mechanism, a series of circuits corresponding to a denominational order of load values, means controlled by the weighing mechanism for partially completing one of said circuits, a commutator having a set of contacts, one in each circuit, a feeler, automatic power means having an invariable cycle of operation for moving said feeler and contacts relatively to cause the contacts to be successively engaged by said feeler to thereby close the partially completed circuit during said cycle, and an indicator for manifesting said order of load values and controlled by the completed circuit to manifest the load value corresponding to the latter circuit.

19. In combination; load weighing mechanism, settable offsetting weights to be applied to said mechanism to counterbalance the load, circuits for selectively controlling application of said weights to said weighing mechanism, means controlled by the weighing mechanism to selectively and partially complete said circuits, and a commutator having actuating means separate from the weighing mechanism for completing the selected circuits to cause application of the offsetting weights to counterbalance the load.

20. In combination; load weighing mechanism, settable offsetting weights to be applied to said mechanism to counterbalance the load, electrical sensing instrumentalities cooperating with the weighing mechanism to sense the load value, a timed contactor cooperating with the load sensing instrumentalities to read out a timed impulse equivalent to the load value sensed by said instrumentalities, means timed synchronously with the contactor for receiving the timed impulse from the latter, and circuits controlled by the latter means to apply the weights to said mechanism to counterbalance the load value sensed by said instrumentalities.

21. In combination; load weighing mechanism, settable offsetting weights to be applied to said mechanism to counterbalance the load, electrical sensing instrumentalities controlled by the weighing mechanism to sense the load value, a timed electrical device cooperating with the instrumentalities to read out a timed impulse equivalent to the load value sensed by said instrumentalities, means synchronously operated with the timed device for receiving the impulse therefrom, and a combination of circuits closed by said means upon receiving said impulse to apply a combination of said offsetting weights to said mechanism to offset the load value sensed by said instrumentalities.

22. In combination; load weighing mechanism, electrical sensing means controlled by said weighing mechanism to sense load values, an impulse emitter cooperating with said electrical sensing means to emit electrical impulse equivalents of the load, separate load manifesting devices, separate electrical controls for said devices, and means for distributing each of said emitted impulses simultaneously to said separate electrical controls to cause related operation of the both devices according to the load values sensed by said sensing means.

23. In combination; load weighing mechanism, electrical sensing means controlled by said weighing mechanism to sense load values, an impulse emitter cooperating with said electrical sensing means to emit electrical impulse equivalents of the load, separate devices, separate electrical controls for said devices, and means for distributing each of said emitted impulses simultaneously to said separate electrical controls to cause related operation of both said devices according to the load value sensed by said sensing means, one of said devices including load offsetting weights selectively applied to said weighing mechanism to counterbalance the sensed load and the other device including means for manifesting the load value offset by said weights.

24. In combination; weighing mechanism for weighing a multi-denominational order load, cyclically operable driving mechanism having means to drive it through several cycles at each single load weighing operation, load determining means cooperating with the weighing mechanism to determine the load values therefrom, multi-denominational order load manifesting elements, and means actuated by the driving mechanism during successive of said cycles and cooperating with the load determining means for selectively controlling operation of the several orders of elements in succession, one order element each cycle.

25. In combination; weighing mechanism to weigh a multi-denominational order load, a single order of load value reading means, means for selectively cooperatively relating said order of reading means to said weighing mechanism to successively read the values in each order of the load, one order after another, and multi-denominational order load manifesting devices controlled by the reading means for operation in accordance with the complete multi-order translation of the load order values acting on the weighing mechanism.

26. In combination; weighing mechanism to weigh a multi-denominational order load, a single order of load value reading means, means for adjustably cooperatively relating said reading means to said weighing mechanism to successively read the values of the load orders, one order after another, and value manifesting means selectively controlled by the reading means according to the successive load order values translated thereby.

27. In combination; weighing mechanism to weigh a multi-denominational order load, load value reading means connected to said weighing mechanism to read one order of load values at a time, a cyclically operable mechanism, means controlled by the latter for successively varying the connections between said weighing mechanism and said reading means to cause the latter to successively read the load order values, one order after another, and multi-denominational order value manifesting devices selectively controlled by the reading means in accordance with the complete successive reading of the load orders.

28. In combination; weighing mechanism for weighing a multi-denominational order load, load reading means for reading one order of the load at a time, variable connections between said weighing mechanism and said reading means for transmitting one order of the load at a time to said reading means, and a device automatically operative upon completion of the reading of one order of the load for varying said connections to cause the weighing mechanism to transmit a different order of the load to the reading means.

29. In combination; a load support for carrying a multi-denominational order load, a set of factor levers, a set of load value sensing elements corresponding to the digital values of a load order and connected to the factor levers to receive separate factored portions of the load, connections between said support and said factor levers to transmit a proportion of the load force corresponding to one order of the load, and other connections between the support and factor levers to alternatively transmit a different proportion of the load to said factor levers bearing a denominational relation to the first named proportion and thereby corresponding to a different order of the load, and means for disabling the first-named connections and rendering the second-named connections effective to transmit the load to said factor levers.

30. In combination; a load support, load reactive means, variable ratio connections between the load support and the load reactive means to transmit different proportions of the load to said means, an actuator, and devices automatically controlled by a single operation of the actuator for successively varying the connections to successively provide different predetermined ratios between said load support and said load reactive means.

31. In combination; a load support, load reactive means, variable ratio connections between said load support and said means, devices for varying said ratio connections to adjust the proportion of load transmitted to the reactive means, means for selecting said devices for operation, and mechanism automatically set in operation by and upon application of a load to the support for controlling operation of the selecting means.

32. In combination; weighing mechanism to weigh a multi-denominational order load, load value reading means cooperating with said weighing mechanism to read the load order values, a cyclically operable mechanism, and load manifesting means controlled by the latter during successive cycles of said mechanism for cooperating with the reading means to convert the reading of the load order values in succession, one order each cycle, into load manifestations.

33. In combination; weighing mechanism to weigh a multi-denominational order load, electrical load value sensing means cooperating with said weighing mechanism to sense the load order values, a cyclically operable mechanism including an electrical impulse emitter operated by said mechanism through several cycles and cooperating with the sensing means during successive cycles to convert the sensing of the load order values, one order each cycle, into electrical equivalents.

34. In combination; weighing mechanism, a plurality of denominational order sets of load value sensing elements, each set having a plurality of elements with each selectively responsive to a different, single, digital value of a transmitted order of load forces, connections between the weighing mechanism and said sets of elements to transmit denominationally related proportions of the load to the several sets whereby each set senses a different order of a multi-denominational order load, multi-denominational order value manifesting devices, and means controlled by said sets of elements for operating said devices according to the denominational order load values.

35. In combination; weighing mechanism for weighing a multi-denominational load, a plurality of sets of load value sensing elements, the sets being in denominational order relationship and each set having a series of elements each of which corresponds to a different single digital value of a corresponding load order, a plurality of sets of factor levers, each set connected to one order of sensing elements to divide a denominational order of the load force among said elements, selective connections between the weighing mechanism and said sets of factor levers to transmit different denominationally related proportions of the load force to each such set of levers, and multi-order value manifesting devices selectively operated under control of those elements of the several orders which correspond to the multi-denominational order values of the transmitted load.

36. In combination; load weighing mechanism, indicating mechanism, power means other than the weighing mechanism for operating the indicating mechanism from home positions to manifest a value corresponding to the load, an intercontrol between the weighing and indicating mechanisms to control operation of the latter by said power means, and automatic mechanism operable to cause a complete return to home positions of the indicating mechanism upon any change in the load exceeding a minimum value.

37. In combination; load weighing mechanism, indicating mechanism, cyclically operable means having a cycle of operations for operating the indicating mechanism from home positions according to the load, an intercontrol between the weighing and indicating mechanisms to control the setting of the indicating mechanism by said means, automatic devices controlled by the weighing mechanism to cause a complete return to home positions of the indicating mechanism upon any change in the load exceeding a minimum value, and means automatically controlled by the weighing mechanism following the resetting of the indicating mechanism to initiate a repeat cycle of operations of said first-named means to set the indicating mechanism according to the changed load.

38. In a weighing scale; the combination of a load support, a cyclically operating mechanism having a plurality of cycles of operation at each application of a load to said support, a plurality of sets of load offsetting devices, means connected to the support and the devices to which the latter may be selectively applied to counterbalance the load, load sensing means coacting with said operating mechanism during one cycle of the latter to select offsetting devices of one set only and during the next cycle to select devices of another set only, and instrumentalities for applying the selected load offsetting devices to said connections to counterbalance a single applied load.

39. In combination; load weighing mechanism, electrical sensing means controlled by said weighing mechanism to sense load values, an electrical impulse emitter cooperating with said electrical sensing means to emit electrical impulse equivalents of the load, value manifesting means, and means controlled by the emitted impulse equivalents of the load to operate the value manifesting means according to the load values sensed by the aforesaid sensing means.

JAMES WARES BRYCE.